Nov. 17, 1925.
H. G. KING
DIRECTION SIGNAL FOR AUTOMOBILES
Filed June 7, 1924     3 Sheets-Sheet 1
1,562,339
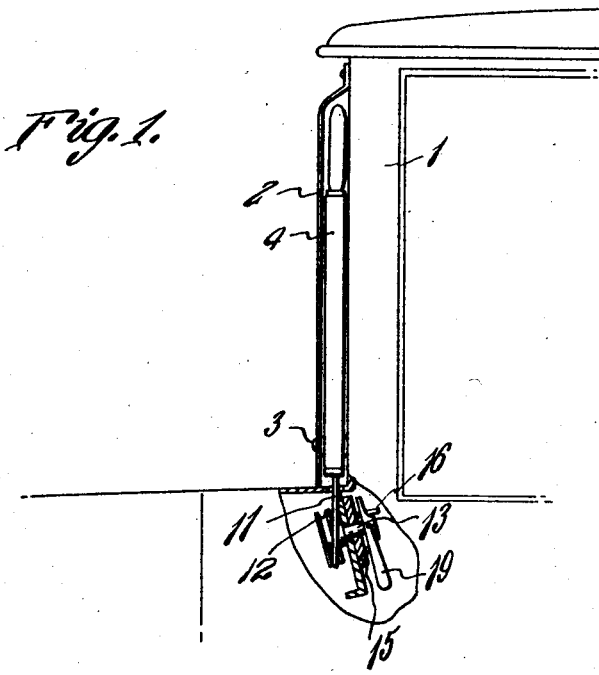
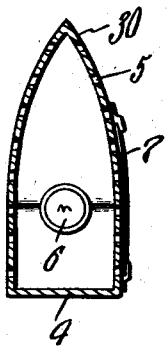
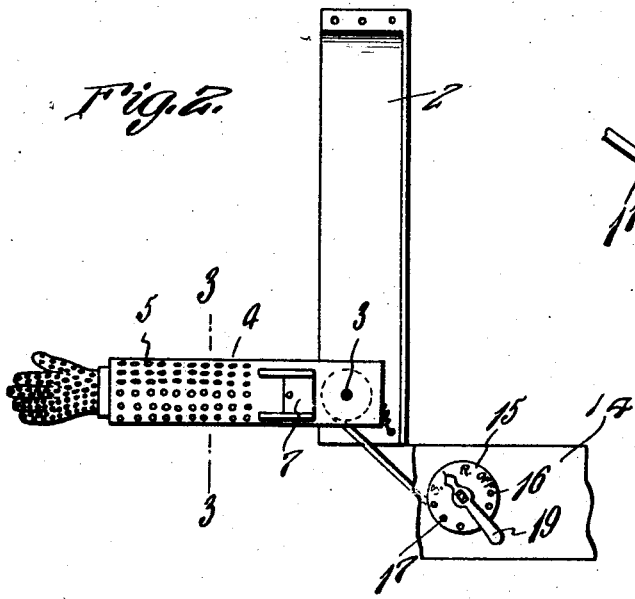
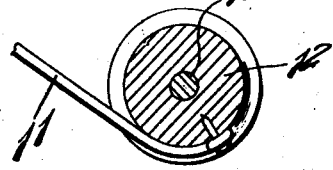

Nov. 17, 1925.  
H. G. KING  
1,562,339

DIRECTION SIGNAL FOR AUTOMOBILES

Filed June 7, 1924     3 Sheets-Sheet 2

WITNESS:

H. G. King
INVENTOR by Victor J. Evans
ATTORNEY

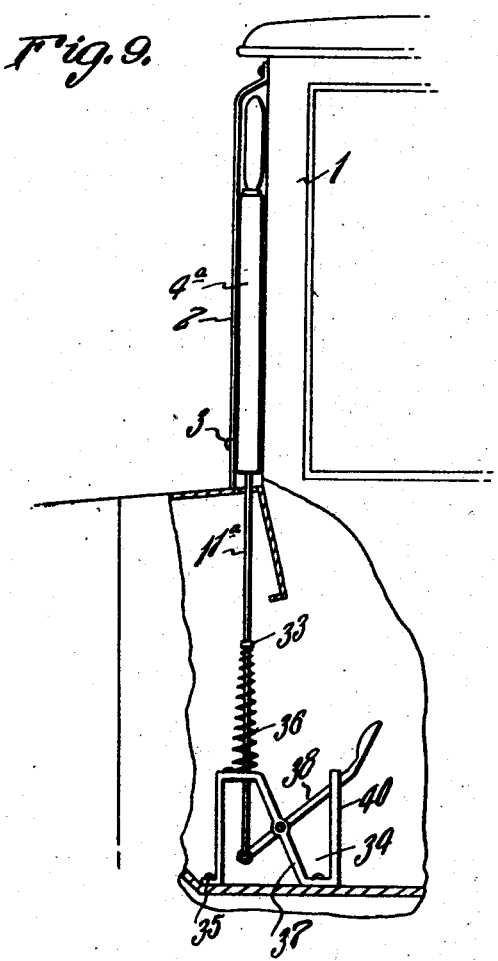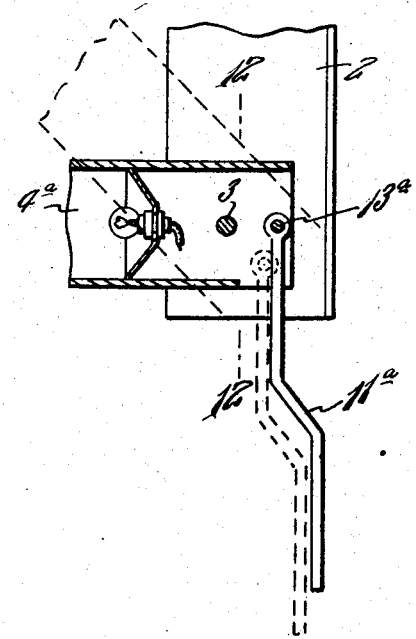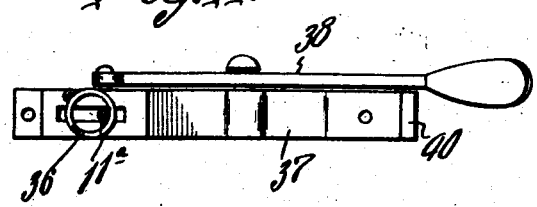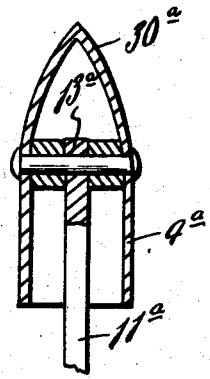

Patented Nov. 17, 1925.

1,562,339

UNITED STATES PATENT OFFICE.

HERBERT G. KING, OF VICTORIA, TEXAS.

DIRECTION SIGNAL FOR AUTOMOBILES.

Application filed June 7, 1924. Serial No. 718,596.

*To all whom it may concern:*

Be it known that I, HERBERT G. KING, a citizen of the United States, residing at Victoria, in the county of Victoria, and State of Texas, have invented new and useful Improvements in Direction Signals for Automobiles, of which the following is a specification.

The object of my said invention is the provision of a simple and practically advantageous automobile signal embodying a peculiar and efficient semaphore arm and operative control means through the medium of which the semaphore arm can be quickly and conveniently moved and secured in various positions by the driver of an automobile without the necessity of the driver moving his hand outside of the automobile body.

Other objects and practical advantages of the invention will be fully understood from the following description and claims when the same are read in connection with the drawings, accompanying and forming part of this specification.

Figure 1 is a view, partly in side elevation and partly in vertical section, showing the arrangement of the parts in one embodiment of my invention relative to an automobile.

Figure 2 is a detail section taken at right angles to Figure 1 and showing the semaphore arm of the improvement as extended laterally relative to an automobile.

Figure 3 is an enlarged cross-section taken in the plane indicated by the line 3—3 of Figure 2.

Figure 4 is a detail section taken through the pulley of the improvement and showing the connection of the cable to said pulley.

Figures 9 to 13 are views of a modification hereinafter explicitly referred to.

Similar numerals designate corresponding parts in Figures 1 to 8 to which reference will first be made.

Figure 5:
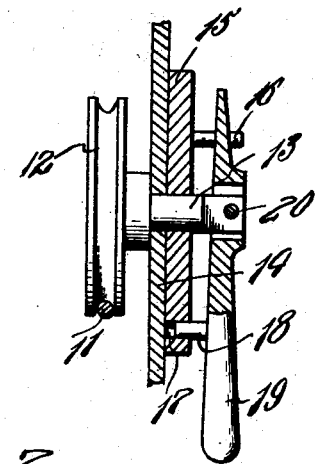
Figures 5 and 6 are enlarged views of the control mechanism of the improvement.
Figure 6:
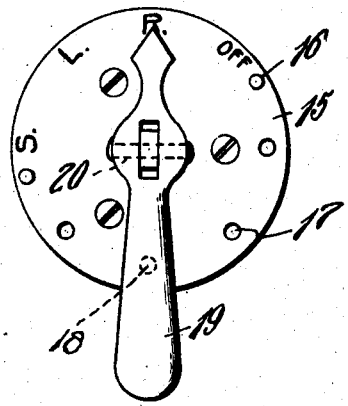
Figure 7:
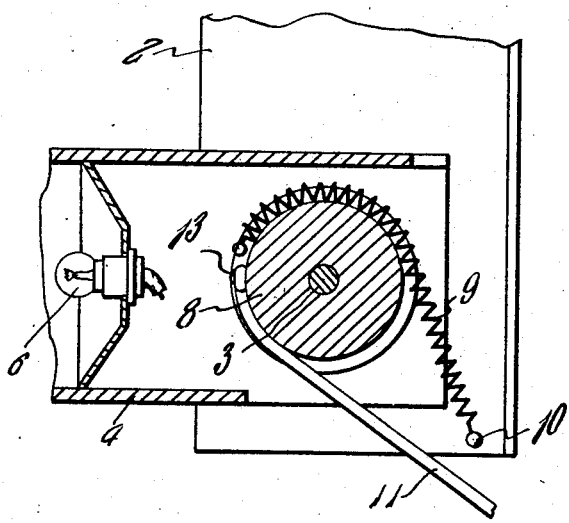
Figure 7 is a fragmentary section showing the arrangement of the semaphore arm, the housing therefor, the retractile spring and the cable.

I illustrate in Figure 1 a portion of an automobile body designated by 1, and in accordance with one embodiment of my invention I fix to the forward left hand corner portion of the said body 1 a housing 2, disposed in upright position and open at its outer side as shown in Figure 1. In the said housing 2 and pivoted at 3 is a semaphore arm 4 adapted to be swung from the position shown in Fig. 1 to that shown in Figures 2 and 7 and vice versa. The said arm 4 is preferably made to simulate a human hand and arm, as illustrated in Figure 2, and the arm throughout is preferably hollow and foraminous as designated by 5 and is designed to contain an incandescent electric lamp 6, Figure 7. The arm 4 is preferably of the cross-sectional shape shown in Figure 3, and it is provided at 7 with a door through which access may be gained to the lamp 6 whenever the same is necessary. At this point I desire it understood that current is supplied to the lamp 6 in any approved manner not of my invention, and I have therefore deemed it unnecessary to illustrate the electric connection complementary to the lamp 6. As shown in Figure 7 a circular member 8 is fixed in and to the arm 4 so as to move with the said arm 4 about the center 3. To the periphery of the member 8 is connected one end of a retractile spring 9, the other end of which is connected at 10 to the lower portion of the housing 2. From this it follows that when the arm 4 is swung out of the housing 2 as shown in Figures 2 and 7, the spring 9 will be tensioned or stretched with the result that when the arm is released, the spring 9 will function to return the arm 4 to the position shown in Figure 1—i. e, within the housing 2 and out of sight to a considerable extent. Manifestly in virtue of the arm 4 being hollow and foraminous, the arm will when the lamp 6 is in operation emit rays of light so as to render the arm 4 readily discernible in darkness For the purpose of enabling the driver within the car body to quickly and easily manipulate the arm 4 without the necessity of the driver putting his hand or arm out of the car body I provide the cable 11 and I also provide a pulley 12, the said cable 11 being connected at one end 13 to the circular member in the arm 4 and being connected at its opposite end to the pulley 12 It will be noted here that the member 8 is circumferentially grooved as is also the pulley 12. The said pulley 12 is fixed to a spindle 13, and the said spindle is journaled in an appropriate support 14 within the automobile body. Fixed to the said support 14 is a dial plate 15 through which the spindle 13 also extends, and it will be noted that the said dial plate 15 is provided on its face with appropriate legends, Figures 2 and 6, and is also provided with a stop pin 16 and an arcuate series of apertures 17. The said apertures 17 are for the socketing of a pin 18 on a pointer handle 19 which is connected at 20 to the spindle 13 and is keyed to the said spindle as appears in Figures 5 and 6 so that rotation of the spindle about its axis will attend swinging of the pointer handle in a plane in substantial parallelism with the face of the dial plate 15. It will also be noticed that the pointer handle 19 is capable of being swung at right angles to the face of the plate 15 for the socketing of the pin 18 in one of the apertures 17 or for the removal of the pin from said apertures.

It will be readily appreciated from the foregoing that the taper of one longitudinal edge of the arm 4 as designated by 30 in Figure 3 is materially advantageous inasmuch as it facilitates the swinging movement of the arm into the housing 2. In the practical use of my improvement, the arm 4 is designed to be placed in an upwardly and outwardly inclined position when it is desired to signal a turn to the right, while when it is desired to signal a turn to the left the arm 4 is positioned as shown in Figure 2. Again when the arm is positioned in outwardly and downwardly inclined relation it is intended to signal that the automobile is about to be brought to a stop. It will be noted by comparison of Figures 2 and 6 that the control means is so relatively arranged and connected that the arm 4 will be positioned as shown in Figure 2 when the pointer handle is opposite the initial "L", and from this it will be understood that when the arm 4 is in outwardly and upwardly inclined position the pointer handle will be opposite the initial "R", while when the arm 4 is inclined outwardly and downwardly the pointer handle will be directed toward the initial letter "S". When the arm 4 is positioned in the housing 2, the end of the pointer handle will be against the stop pin 16.

From this it follows that incident to the operation of my novel signal the driver has but to observe the control mechanism, and it also follows that by the co-operation of the handle 19 and the pin 18 carried thereby with the apertures in the dial plate 15, the arm 4 can be quickly fixed in detachable manner in the various positions indicated. In this connection it will be appreciated that while the arm 4 is secured as stated in various positions, the arm can be quickly released by manipulation of the handle 19 in one direction after which the handle 19 can be employed to turn the spindle 13 and the pulley 12 and to move the arm 4.

The embodiment illustrated in Figures 9 to 13 entails the employment of one foot of the driver for the adjustment of the semaphore arm $4^a$, the said arm $4^a$ being generally similar to the arm 4, and being pivoted at 3 in a housing 2.

Figure 13:
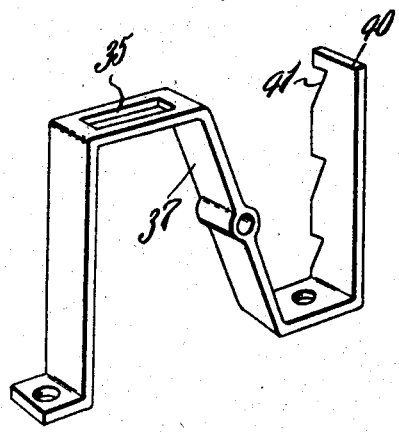
Figure 8:
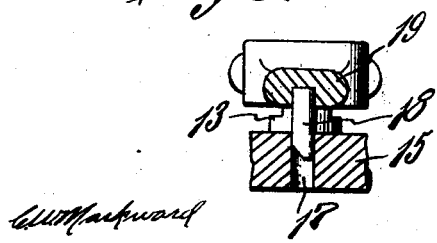
Figure 8 is an enlarged detail cross-section of the control device.

In accordance with the modification of my invention, a rod $11^a$ is pivotally connected at $13^a$ to the heel end of the arm $4^a$, and the said rod $11^a$ is provided with an abutment 33, Figure 9, and is guided in a stand 34, Figures 9 and 13, appropriately fixed at 35 on the floor of the automobile body. The said rod $11^a$ is disposed in a slot 35 in the stand 34, and a coiled spring 36 is arranged about the rod $11^a$ and in interposed relation between the stand 34 and the abutment 33. From this it follows that downward movement of the rod $11^a$ necessary to swing the arm $4^a$ into the housing 2 will be attended by compression of the spring 36 so that when the said rod $11^a$ is released the spring 36 will operate to swing the arm $4^a$ out of the housing 2. The stand 34 is provided with an inclined intermediate portion 37, and to said portion 37 is pivoted at an intermediate point of its length a pedal lever 38. At its forward end said pedal lever 38 is pivotally connected to the lower end of the rod $11^a$. The rear arm of the lever 38 is arranged to be moved vertically alongside the rear upright 40 of the stand 34. As best shown in Figure 13 the edge of the upright 40 is toothed, and the teeth 41 are so disposed that the lever 38 may be easily moved downward alongside the same. It will also be noticed that by slight lateral movement of the lever 38 it may be put into or out of engagement with any one of the teeth of the upright 40.

As appears in Figure 12 one edge of the arm $4^a$ is tapered in cross-section as designated by $30^a$ to facilitate the movement of said arm into the housing 2.

It is believed that from the foregoing the operation of the embodiment shown in Figures 9 to 13 will be readily understood, but it is to be noted that incident to said operation the driver positions the arm $4^a$ according to the extent to which he moves the pedal lever 38 downward from the position shown in Figure 9. It will also be noted that on the release of the pedal lever 38 from any one of the teeth of the upright 40, the spring 36 will promptly return the arm $4^a$ to its idle position in the housing 2.

I have specifically described the construction and relative arrangement of the parts in the preferred embodiments of my invention in order to impart an exact understanding of the said embodiments. I do not desire, however, to be understood as confining myself to the said specific construction inasmuch as my invention is defined by my appended claims, and various changes or modifications may be made within the scope of said claims without departure from my invention.

Having described my invention, what I claim and desire to secure by Letters-Patent, is:—

1. In an automobile direction signal, the combination of an automobile body, a swinging semaphore arm having fixed in and to its heel portion a circumferentially grooved circular member, a retractile spring connected at its end to said member and arranged to partly lie in the groove of the member, a pulley mounted within the automobile body and having a circumferential groove, a cable connected to said member and pulley and arranged to partly lie in the grooves thereof, means for operating said pulley, and means for adjustably fixing the pulley.

2. In an automobile direction signal, the combination of an automobile body, a semaphore arm, a stand fixed to the floor of the body and having an aperture and also having an inclined intermediate portion and a toothed upright, a rod connected to the semaphore arm and extending through said aperture and having an abutment, a spring surrounding the rod and interposed between the stand and said abutment, and a pedal lever fulcrumed on the inclined portion of the stand and having its forward arm connected to said rod and its rear arm positioned to be engaged with the toothed upright of the stand.

In testimony whereof I affix my signature.

HERBERT G. KING.